SUBSTITUTE FOR MISSING XR
May 17, 1966     F. T. THOMPSON ET AL     3,252,001
VIBRATION DETECTION APPARATUS
Filed Nov. 29, 1961
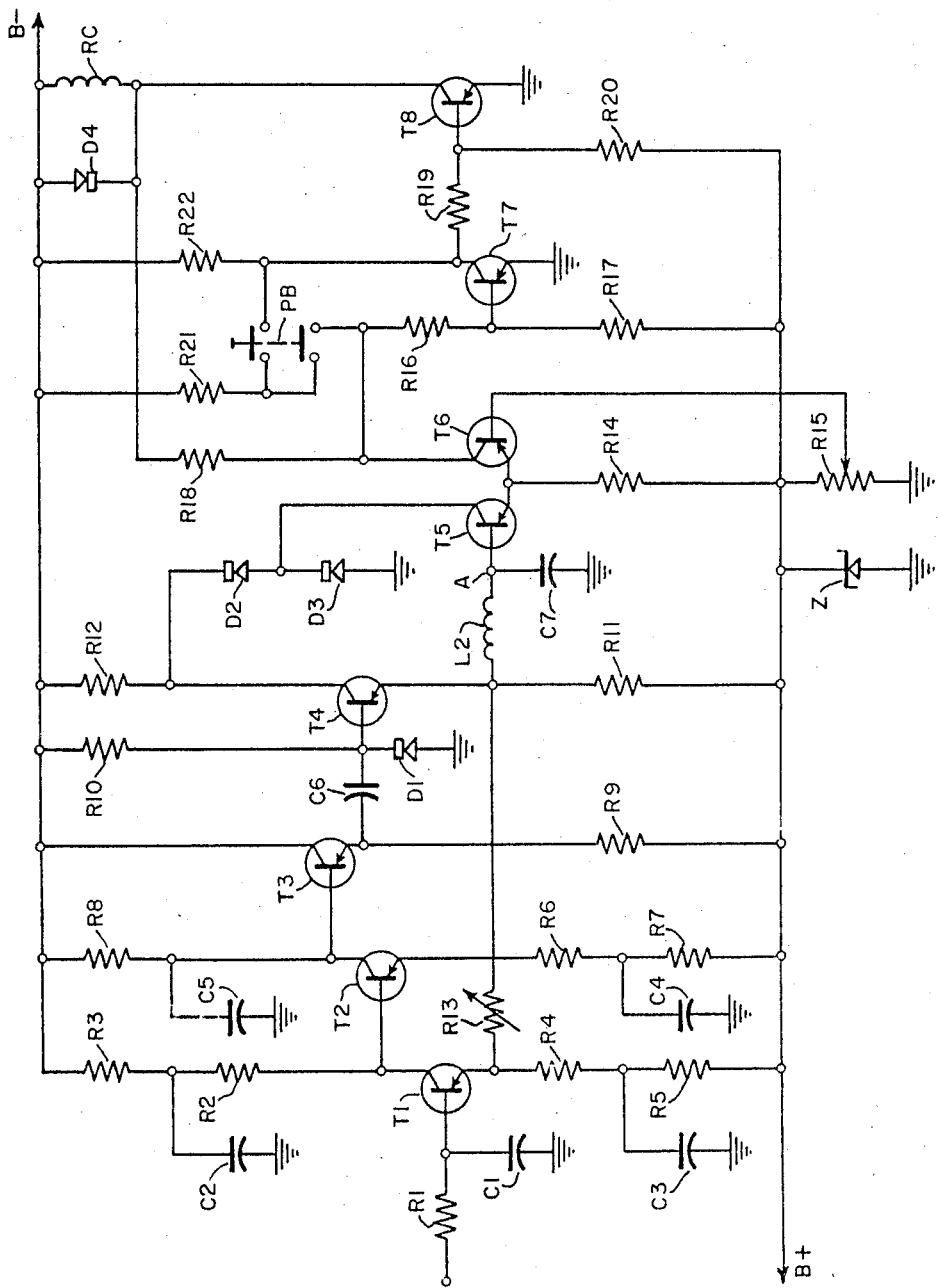
WITNESSES
INVENTORS
Francis T. Thompson and
Bruce R. Dow
BY
ATTORNEY

United States Patent Office 3,252,001
Patented May 17, 1966

3,252,001
VIBRATION DETECTION APPARATUS
Francis T. Thompson, Palo Alto, Calif., and Bruce R. Dow, Pittsburgh, Pa., assignors to Westinghouse Electric Corporation, East Pittsburgh, Pa., a corporation of Pennsylvania
Filed Nov. 29, 1961, Ser. No. 155,770
3 Claims. (Cl. 307—88.5)

The present invention relates to signal detecting apparatus and more particularly to apparatus for the detection of the amplitude of vibrations.

The safe and reliable operation of large rotating shaft apparatus, such as steam turbines, electrical generators and motors, requires knowledge of the vibration at or near the shaft bearings. Most large rotating shaft apparatus exhibits a shaft resonance at one or more speeds within the normal operating speed range. Emergency warning is therefore required in order to change the operating speed of the apparatus before the vibration reaches a destructive amplitude. Continuous monitoring and recording of the amplitude of vibration is desirable as the record may serve as a guide for maintenance as well as providing information on emergency conditions. For reliability, it is preferred that solid state devices be used rather than tubes. To maintain high accuracy in controlling the level of the alarm action of the trip apparatus, the detected signal should not be applied directly to the trip mechanism. Moreover, for high accuracy, means should be provided in the detection apparatus so that any errors introduced by its components may be properly compensated.

It is therefore an object of the present invention to provide new and improved vibration detection and trip apparatus.

It is a further object of the present invention to provide new and improved signal detection and trip apparatus which is highly accurate and reliable.

Broadly, the present invention provides detection and trip apparatus which is operative with an analog input signal proportional to a physical phenomenon, wherein this analog signal is demodulated and compared with a reference signal to provide an actuating signal when the analog signal exceeds the reference level, and thereby causes an output circuit to be activated in response thereto.

These and other objects will become more apparent when considered in view of the accompanying specification and drawing, in which the single figure shows a schematic drawing embodying the features of the present invention.

Referring to the figure, the incoming signal may, for example, be a sine wave whose amplitude and frequency are proportional to that of a vibration in a rotating shaft apparatus, such as a steam turbine. This incoming signal is applied to the filter, consisting of resistor R1 and the capacitor C1. The attenuation versus frequency characteristic of the filter eliminates the proportionality of signal amplitude to the frequency of the phenomenon being detected. The amplitude of the signal applied to the base of T1 is independent of input frequency because of the action of the filter. If an input signal were available which had amplitude independent of the frequency of the phenomenon detected, components R1 and C1 could be omitted or their values chosen such that they provide noise suppression only. The input signal source must have a low internal resistance or a resistor must be connected from the input terminal to ground. The filtered signal is applied to the base of the transistor T1, which along with the bypass capacitors C2 and C3, the biasing resistors R2 and R3 connected from the collector of the transistor T1 to the collector power supply, and the bias resistors R4 and R5 connected from the emitter of the transistor T1 to the bias power supply, comprise the first amplifier stage. The bypass capacitors C2 and C3 connected between the resistors R2 and R3 and R4 and R5, respectively, are included to provide a low impedance path to alternating signals, so that resistors R2 and R4 effectively control the no feedback gain of the first stage. The amplified incoming signal at the collector of the transistor T1 is applied to the second amplifying stage at the base of the transistor T2. The second amplifying stage comprises the transistor T2, the biasing resistors R6 and R7 connected from its emitter terminal to the bias supply, the resistor R8 connected between its collector terminal and the collector supply, the bypass capacitor C4, and the stabilization capacitor C5. The bypass capacitor C4 is connected between the resistors R6 and R7 to provide a low impedance to ground, so that, similar to the first stage, R6 and R8 determine the stage voltage gain. The capacitor C5 is connected from the collector of the transistor T2 to ground to stabilize the amplifying stages against oscillation. The bypass capacitors C2, C3, and C4 in conjunction with, respectively, R3, R5, and R7 provide extra filtering for the direct supply voltages. Since the supply voltages may be obtained by rectifying an alternating voltage, the frequency of which may be within the normal range of signal frequencies, this extra filtering may be of great importance. From the collector of the transistor T2, the amplified incoming signal is applied to the base of the transistor T3 of an emitter follower stage. The collector of the transistor T3 is connected to the collector supply to maintain the collector at the collector supply voltage level. The current limiting resistor R9 is connected between the emitter of the transistor T3 and the bias supply.

In order to compare the alternating signal appearing at the emitter of the transistor T3 with a direct reference voltage, it must be converted from an alternating signal into a unidirectional signal. By a unidirectional signal is meant one that has only one polarity, for example, positive, but which may vary in amplitude within the positive direction. The demodulator, comprising the capacitor C6 connected between the emitter of the transistor T3 and the base of the transistor T4, the diode D1 connected between the base of the transistor T4 and ground and the resistor R10 connected between the transistor T4 and the collector supply, is utilized to convert the signal appearing at the emitter of T3 from a signal, the polarity of which alternates about a D.C. level, to a unidirectional signal which may vary only such that the most negative excursion of the alternating signal is always at zero or ground potential and the signal amplitude varies from zero to some maximum positive amplitude. The diode D1, with anode connected to ground and cathode connected to one side of the capacitor C6, clamps the capacitor to ground potential for negative excursions of the analog signal appearing at the emitter of the transistor T3. Thus, the negative excursion of the signal on the emitter of the transistor T3 charges the capacitor C6 through the diode D1 in the positive polarity as shown. During the remainder of the cycle, the capacitor C6 partially discharges through the resistor R10 to the collector supply. During the next cycle, if the amplitude of the signal at the emitter of the transistor T3 increases, the capacitor C6 quickly charges to a new potential which is approximately the maximum negative swing of the signal at the emitter of transistor T3. However, if the signal appearing at the emitter of the transistor T3 decreases, the demodulated signal appearing at the base of the transistor T4 decreases only at a rate determined by the RC time constant of the capacitor C6 and the resistor R10, until the voltage across the capacitor C6 has decayed to the peak value of the signal then appearing at the emitter of the transistor T3. It can be seen that there is thus a short time constant for increasing incoming signals and a long time constant for decreasing incoming signals.

The unidirectional signal, which for a sinusoidal input signal varies sinusoidally between ground potential and a positive value, is applied to the second emitter follower stage at the base of the transistor T4. Between the emitter of the transistor T4 and the bias supply is connected the current limiting resistor R11. The collector of the transistor T4 is connected to the cathode of the diode D2 of the diode voltage reference consisting of diodes D2 and D3 and resistor R12; thus clamping the collector of the emitter follower stage to a predetermined constant voltage.

The non-ideal characteristic of the diode D1 causes the wave form appearing at the base or emitter of the transistor T4 to be slightly clipped in its lowest potential excursion. To compensate for this clipping and also for the usual stability and gain stabilization purposes, a feedback connection is provided between the emitter of the transistor T4 and the emitter of the transistor T1. By providing feedback of the unidirectional signal, which is slightly clipped at its lower potential excursion, the signal at the collector of the transistor T1 is caused to have a small positive voltage step on the positive excursion peak of the signal output. Thus, when the signal with the step is applied to the demodulator circuit, the inherent error caused by the characteristics of the diode D1 is compensated by the distortion reduction obtained with negative feedback. A more accurate unidirectional signal is then provided to the base of the transistor T4 as the most negative excursion of the unidirectional signal is now more closely at ground potential and the signal distortion has been reduced. The overall voltage gain from the base of T1 to the emitter of T4 is controlled by feedback and is adjusted by variable resistor R13. The gain reduction effected by the feedback is sufficient to ensure low distortion and stable gain. Direct current as well as alternating current is conducted through the feedback path as no series capacitor is used. This allows the bias voltages for the various stages to be determined by input signal amplitude. The biasing for the amplifier is designed to accommodate this; so no degradation of performance occurs. The resultant effect of the direct current feedback is to maintain bias conditions at T2 just adequate for the signal amplitude; thus minimizing the time integral of power dissipated in T2.

The maximum negative excursion of the signal at the base of T4 is still slightly negative even with the feedback compensation. However, the slight voltage offset between base and emitter of the transistor T4 is in such a direction as to cancel this error to provide a signal at the emitter of T4 which varies in the positive direction from very nearly ground potential. This unidirectional signal is then applied to the LC filter network comprising the inductor L2 and the capacitor C7. The function of the LC filter network is to convert the unidirectional signal to its average value, that is, the time averaged value of the signal appearing at the emitter terminal of the transistor T4 is provided by the action of the filter to the base of the transistor T5. The transistors T5 and T6 together with resistors R14 and R18 comprise a comparator circuit. The emitters of T5 and T6 are commonly connected and in turn are connected through the resistor R14 to the bias supply. The collector of the transistor T5 is clamped at a predetermined potential by the diode voltage regulator. To the base of the transistor T6 is provided a direct current reference signal of a predetermined value, taken from the tap on the potentiometer R15, which is connected between the reference source and ground. The resistor R15 is connected from the bias supply B+ to the Zener diode Z to provide the necessary bias current for the reference. The anode of the Zener diode is connected to ground. The D.C. reference potential applied to the base of T6 is set at a predetermined trip value so that when this value is exceeded at point A, at the base of the transistor T5, an alarm or trip signal will be provided to the output stages of the apparatus. Thus, when the filtered unidirectional signal at the point A is smaller than the reference signal at the base of transistor T6, the transistor T5 will be conducting in its low impedance state and the transistor T6 will be blocking in its high impedance state. With the transistor T6 in its blocked state no alarm signal will be applied to subsequent stages of the apparatus. When, however, the signal voltage at point A exceeds the reference potential at the base of the transistor T6, the base of the transistor T5 becomes more positive than the base of the transistor T6, and conduction shifts from the transistor T5 to the transistor T6. This switching then serves as an indication of an alarm condition or an excessively large vibration occurring at the input of the apparatus.

The transistor T7 is normally conducting in its low impedance state when the transistor T6 is in its blocked high impedance state; with the collector of transistor T6 being connected to the base of transistor T7 through the resistor R16. The base of transistor T7 is connected through the resistor R17 to the bias supply. The output transistor T8 is in its blocked state when the transistor T7 is in its conductive state. When the signal amplitude at point A is sufficiently larger than the reference potential at the base of the transistor T6, the transistor T6 changes to the conducting state and the transistor T5 to the blocked state. Thus, the base of the transistor T7 is made more positive and the transistor T7 is driven out of conduction. The collector of the transistor T7 is connected through the resistor R19 to the base of the transistor T8. Also, the base of the transistor T8 is connected through the resistor R20 to the bias supply. When the transistor T7 changes to its blocked state in response to a signal of sufficient amplitude at point A, the transistor T8 is driven into the conducting state. When the transistor T8 is in its conductive state the relay coil RC is activated, as a low impedance path is provided from the grounded emitter of the transistor T8 through the transistor to the coil RC and then to the collector supply. The contact of the relay can then be used as an alarm or trip signal for protective circuitry to change the operating speed of the rotating shaft apparatus or to give some other alarm action.

Once the transistor T7 has been blocked, it remains blocked through the positive feedback provided from the collector of the transistor T8 through the resistors R18 and R16 to the base of the transistor T7, so that the base of the transistor T7 has a positive potential applied thereto to maintain it in its blocked state.

In order to reset the apparatus so that the transistor T7 may be returned to its original conducting state, the pushbutton switch PB is depressed to connect the terminals 2 and 4. By this connection, the resistors R21 and R16 provide a circuit to the collector power supply to bias the base of the transistor T7 more negatively to allow it to again become conductive, and so switch the transistor T8 back to its blocked state. Thus, once the pushbutton PB has been depressed, the circuit will be restored to its original operating state so that in the absence of an alarm signal at the point A the relay will be de-energized and the circuit will again monitor the input signal. The diode D4 is connected across the coil RC to dissipate the inductive surge.

A metering circuit may be connected at point A to continuously indicate the filtered D.C. signal at this point to provide a continuous record of vibration amplitude.

The advantage of having two different time constants for the demodulator circuit comprising the capacitor C6, the diode D1 and the resistor R10 may be seen in that with a long time constant excessive peaks of amplitude of detected signals may be missed in the monitoring circuit. So by increasing the response to the incoming information for increasing signals these peaks of excessive amplitude may be more readily detected. The resistance of R10 should not be decreased to obtain short time constants for both increasing and decreasing input signals as the accuracy of the circuit will be severely degraded.

It will be evident to those skilled in the art that the operation of the circuit is not changed by the use of NPN rather than PNP transistors or by the use of other variable impedance devices, such as tubes, provided that the appropriate polarities of supply voltages, capacitors, and diodes are employed. It also will be evident that the circuit is useful for input signals representing a variety of phenomena other than vibration. It will be further evident that a demodulator circuit is readily obtained which presents a smaller time constant for decreasing signal amplitude than for increasing by interchanging the resistor R10 and the diode D1.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In signal detection and trip apparatus operative with alternating signals proportional either to the amplitude or to the amplitude and frequency of a detected vibration the combination of: demodulator means to receive said alternating signals and being operative to convert said alternating signals into unidirection signals proportional to the amplitude of said alternating signals, said demodulator means having different time constants for increasing and decreasing amplitudes of said alternating signals, said demodulator means including a capacitive element having an input and an output end to receive said alternating signals at the input thereof, a unidirection device coupled to the output end of said capacitive element to permit said capacitive element to charge to a voltage of a given polarity in proportion to the amplitude of said alternating signals at a relatively short time constant, and an impedance element coupled to said capacitive element at the output end to permit said capacitive element to discharge at a relatively long time constant when the amplitude of said alternating signals drops below the previous charging level on said capacitive element, active element means coupled at an input thereof to the output end of said capacitive element to prevent the discharge of said capacitive element through said active element means and to provide unidirectional signals proportional to the amplitude of said alternating signals and an output thereof, and a feedback impedance element coupled between the output of said active element means and the input end of said capacitive element to compensate for clipping at the maximum excursions of said alternating signals caused by non-ideal characteristics of said unidirection device; comparing means coupled to said demodulator means to compare said unidirectional signals with a predetermined reference level to provide difference signals when said unidirectional signals reach a predetermined level; switching means having two operative states coupled to said comparing means and being responsive to said difference signals to change operative states; output means connected to said switching means to be activated when said comparing means changes state; and holding means coupled between said output means and said comparing means to maintain said switching means in its changed state until reset.

2. A demodulator circuit operative with alternating signals to provide proportional unidirectional signals, comprising: a capacitive element having an input end and an output end connected to receive at its input end said alternating signals, a unidirection device connected to the output end of said capacitive element to allow energy to be stored therein by charging to a level proportional to the amplitude of said alternating signals and provide unidirectional signals, impedance means connected to the output end of said capacitive element to provide a high impedance discharge path for said capacitive element when said alternating signals decrease below the energy level to which said capacitive element has been charged, active element means coupled at an input thereof to the output end of said capacitive element to block the discharge of said capacitive element therethrough and to provide unidirectional signals at an output thereof, and a feedback impedance means coupled between the output of said active element means and the input end of said capacitive element to compensate for clipping at the maximum excursion of said alternating signals caused by non-ideal characteristics of said unidirection device.

3. In signal detection and trip apparatus operative with incoming signals proportional either to the amplitude or to the amplitude and frequency of a detected vibration, the combination of: an input circuit for receiving said alternating signals including a transistor for translating said alternating signals, demodulator means connected to receive said alternating signals translated by said transistor and being operative to convert said alternating signals into unidirectional signals proportional to the amplitude of said alternating signals, said demodulator means having different time constants for increasing and decreasing signals, said demodulator means including a capacitive element having an input and an output end to receive said alternating signals at the input end thereof, a unidirectional device coupled to the output end of said capacitive element to permit said capacitive element to charge to a voltage of a given polarity in proportion to the amplitude of said alternating signals at a relatively short time constant, and an impedance element coupled to said capacitive element at the output end to permit said capacitive element to discharge at a relatively long time constant when the amplitude of said alternating signals drops below the previous charging level on said capacitive element, active element means coupled at an input thereof to the output end of said capacitive element to prevent the discharge of said capacitive element through said active element means and to provide unidirectional signals proportional to the amplitude of said alternating signals and an output thereof, and a feedback impedance element coupled between the output of said active element means and said input circuit to compensate for clipping at the maximum excursions of said alternating signals caused by non-ideal characteristics of said unidirectional device; filter means connected to receive said unidirectional signals and being operative to provide averaged signals proportional to the average value of said alternating signals; comparing means connected to said filter means and being operative to compare said averaged signals with a predetermined reference level and to provide different signals when said averaged signals reach a predetermined level; switching means having two operative states connected to said comparing means and being responsive to said different signals to change operative states upon receipt thereof;

output means connected to said switching means to be activated when said switching means changes states; and holding means connected between said output means and said switching means to maintain said switching means in its changed state until reset.

References Cited by the Examiner

UNITED STATES PATENTS

| | | | |
|---|---|---|---|
| 2,832,915 | 4/1958 | McCoy | 340—261 X |
| 2,992,340 | 7/1961 | Floyd | 307—88.5 |
| 3,040,261 | 6/1962 | Dome | 329—203 |
| 3,049,699 | 8/1962 | Larrick et al. | 340—261 |
| 3,069,672 | 12/1962 | Rau | 340—261 |
| 3,134,970 | 5/1964 | Kelley et al. | 340—261 |
| 3,166,678 | 1/1965 | Fleshman et al. | 328—150 X |

ARTHUR GAUSS, *Primary Examiner.*

JOHN W. HUCKERT, *Examiner.*

J. JORDAN, *Assistant Examiner.*